April 9, 1963 C. L. SEEFLUTH 3,084,489
METHOD OF SEALING THERMOPLASTIC FILM OVERWRAP
Filed Dec. 28, 1959 3 Sheets-Sheet 1
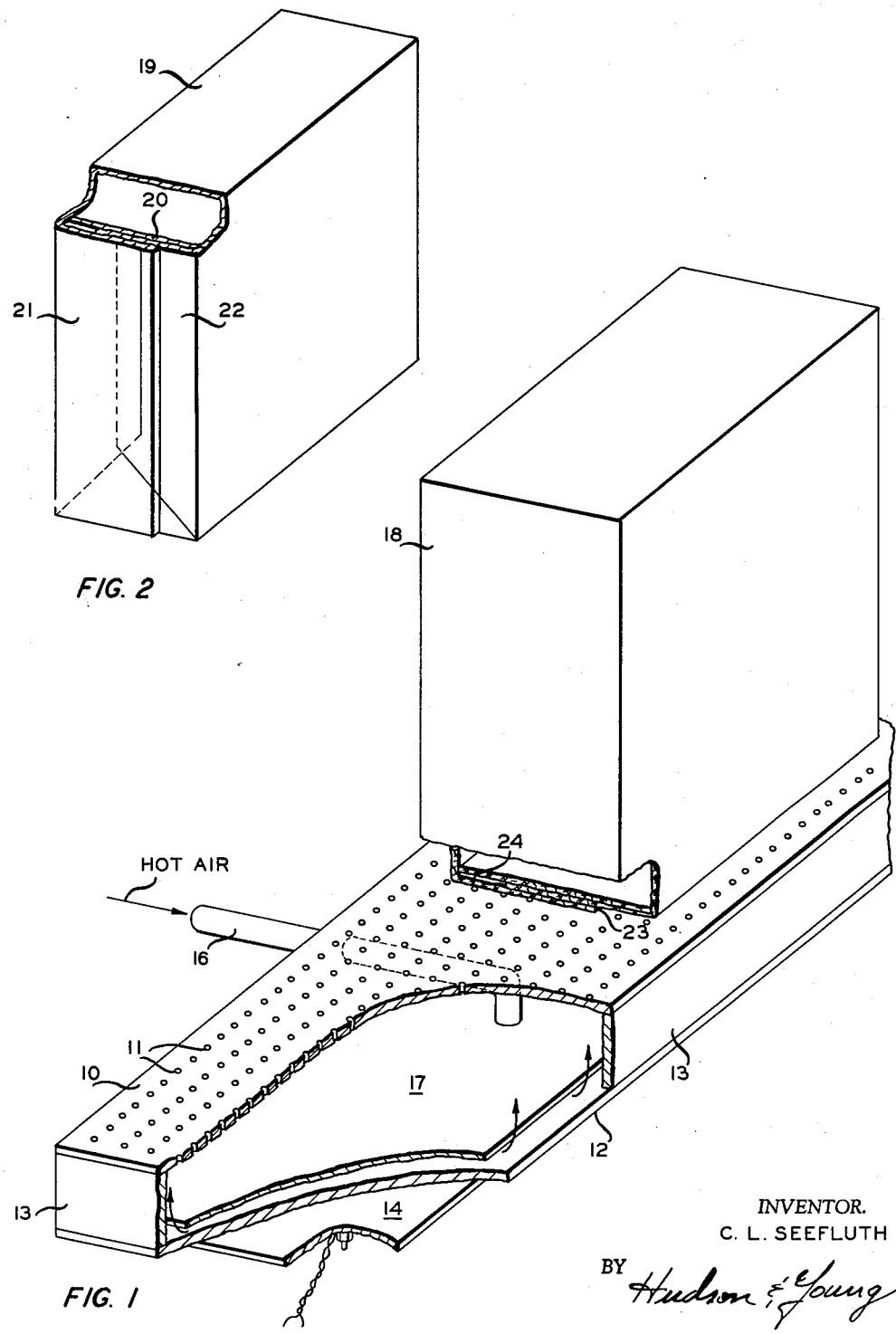
INVENTOR.
C. L. SEEFLUTH
BY Hudson & Young
ATTORNEYS April 9, 1963
C. L. SEEFLUTH
3,084,489
METHOD OF SEALING THERMOPLASTIC FILM OVERWRAP
Filed Dec. 28, 1959
3 Sheets-Sheet 2
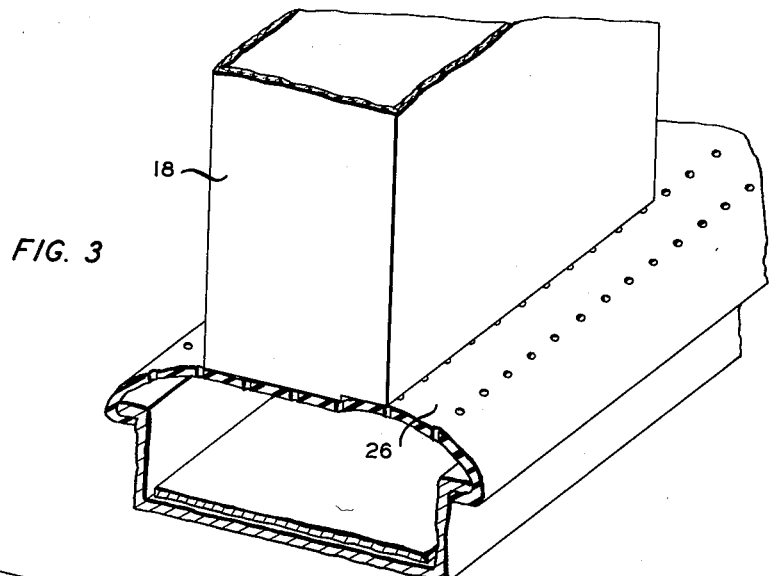
FIG. 3
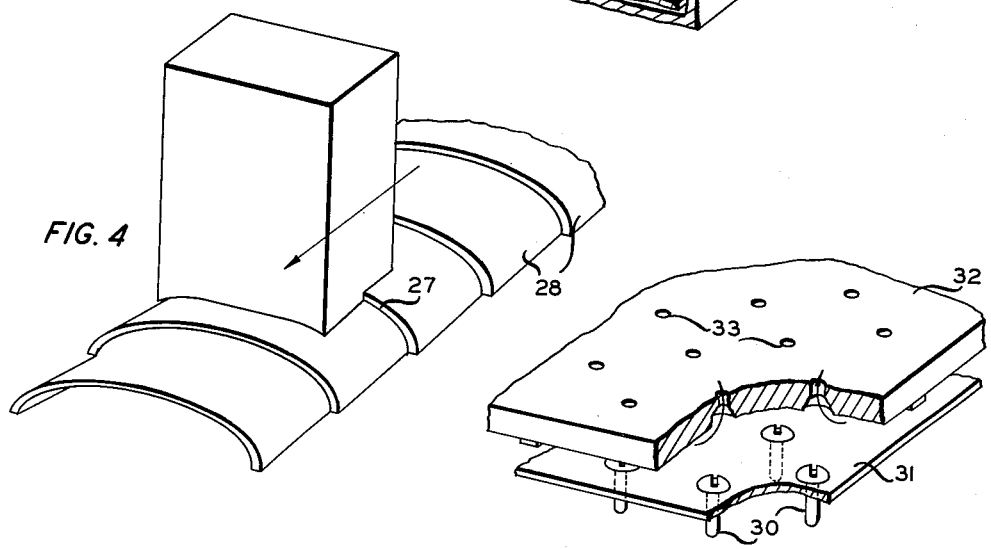
FIG. 4
FIG. 5
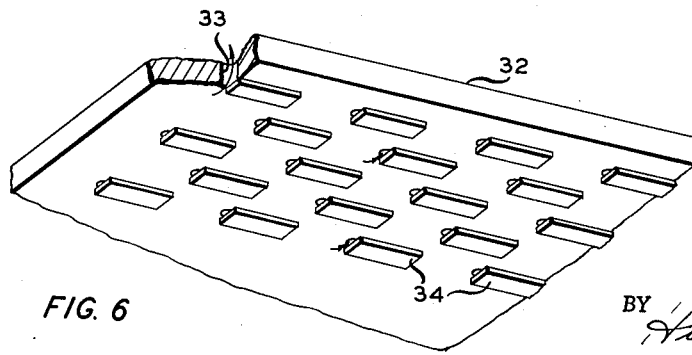
FIG. 6
INVENTOR.
C. L. SEEFLUTH
BY *Hudson & Young*
ATTORNEYS April 9, 1963  C. L. SEEFLUTH  3,084,489
METHOD OF SEALING THERMOPLASTIC FILM OVERWRAP
Filed Dec. 28, 1959  3 Sheets-Sheet 3

INVENTOR.
C. L. SEEFLUTH
BY *Hudson & Young*
ATTORNEYS

United States Patent Office 3,084,489
Patented Apr. 9, 1963

3,084,489
METHOD OF SEALING THERMOPLASTIC
FILM OVERWRAP
Charles L. Seefluth, Bartlesville, Okla., assignor to Phillips Petroleum Company, a corporation of Delaware
Filed Dec. 28, 1959, Ser. No. 862,151
8 Claims. (Cl. 53—39)

This invention relates to a method for sealing a thermoplastic film overwrap on a package. In another aspect, it relates to apparatus which can be used for sealing a thermoplastic film overwrap on a soft package which provides an uneven backing surface for the portion of the film to be sealed.

Thin film of thermoplastic material such as polyethylene is finding increasing acceptance as a package overwrap, replacing cellophane and similar materials in this regard. Such films provide an excellent vapor barrier insuring freshness of the packaged product over long periods.

It is recognized that the protection offered by the package overwrap is no better than the quality of the seal closing the film. Therefore, it is highly important that a strong and continuous seal be formed. If time is of no consequence, thermoplastic films such as polyethylene can be sealed satisfactorily by applying pressure and heating the overlapping edges of the film to temperatures below the crystalline freeze point of the polymer. In mass production of packaged articles, however, a quick seal must be effected in which case the temperature used must be above this crystalline freeze point.

The higher temperatures required for quick-sealing film introduce several problems since the film has very litttle strength at temperatures above its crystalline freeze point. At these high temperatures the film tends to tear as it is moved against a sealing plate. On the other hand, pressure against the sealing plate appears necessary to prevent the film from wrinkling as it is being heated. An even pressure is difficult to obtain in many instances because of the soft and uneven backing surface provided by the package being wrapped.

I have found that the above-discussed problems of film tearing and wrinkling can be solved by sealing the thermoplastic film overwrap by passing the package carrying the overwrap over a perforated surface so that the overlapped film is sandwiched between the package and said surface and passing heated air through perforations in said surface to heat the film above its crystalline freeze point while continuously moving the package over said surface. A simple but effective apparatus for sealing thermoplastic film on a soft package as provided by my invention comprises a plenum chamber made up of a top perforated sealing member which provides a substantially level bearing surface for the package, a bottom plate member which can be heated and wall members joining the sealing and bottom plate members to form an enclosure. Means for introducing gas into the chamber is provided and a baffle is spaced parallel to and near the bottom plate positioned with respect to the means for introducing gas in order to deflect the incoming gas across the heated bottom plate in a thin layer. In this way the incoming gas such as air can be quickly heated to a temperature sufficient to heat the thermoplastic film above its crystalline freezing point.

It is an object of my invention to provide a method for sealing thermoplastic film overwrap on a package. Another object is to provide apparatus suitable for sealing plastic film on a soft package which provides an uneven backing surface for the portion of the film being sealed. Still another object of my invention is to provide a method and apparatus whereby a plastic film having a crystalline freeze point can be sealed quickly at temperatures above this crystalline freeze point without tearing or wrinkling the film. Other objects, advantages and features of my invention will be apparent to those skilled in the art from the following discussion and drawings in which:

FIGURE 1 is an isometric view partly in section of the sealing apparatus of my invention showing a package in sealing position;

FIGURE 2 is a detail of a package showing the uneven backing surface which presents a sealing problem;

FIGURE 3 is an isometric sectional view of the apparatus employing a flexible perforated sealing surface;

FIGURE 4 shows an alternate contoured sealing surface designed to fit the irregularities of the package backing surface;

FIGURES 5 and 6 are details of excess flow valves which can be utilized to advantage with the perforations in the sealing plate.

Figure 7:
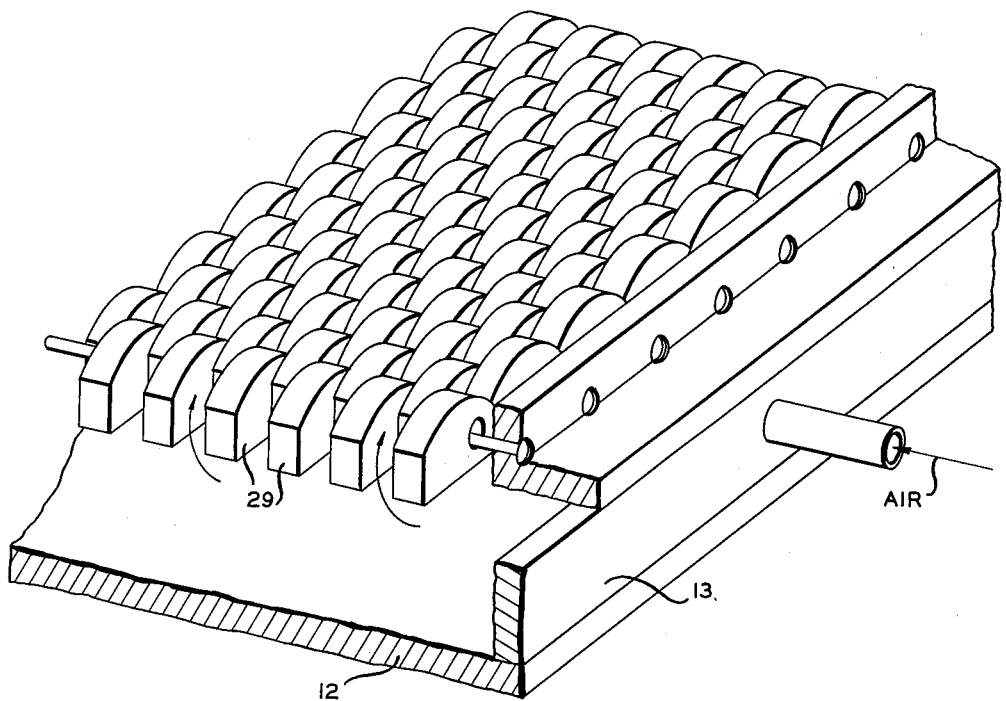
FIGURE 7 is an isometric sectional view of an alternate sealing surface which is made up of a plurality of individual pieces which are linked together but are independently movable a slight distance in the vertical direction.

While my invention can be used to advantage to seal any thermoplastic film used as an overwrap for packaged items, it is of particular advantage when working with thin film of olefin polymers such as polyethylene, polypropylene, or copolymers of ethylene with propylene or 1-butene. Such polymers as polyethylene and polypropylene exhibit a crystalline structure and have a fairly sharp crystalline freeze point above which the films can be readily sealed but at the same time have a very low strength. It can be seen, therefore, that my invention deals with the sealing of such films above their crystalline freeze point in a manner which prevents the films from tearing and substantially reduces their tendency to wrinkle as they are moved across a sealing surface. All the aspects of my invention can best be understood by referring to the drawings.

FIGURE 1 shows an isometric view of one embodiment of my invention partly in section. In this embodiment, the sealing surface is a flat perforated plate which can be made of metal, a thermosetting plastic or ceramic material. It is also within the scope of my invention to provide a coating for the sealing surface of the perforated plate in order to reduce as much as possible the friction between the plate and the film being sealed. Silicone resin coatings can be used in this manner.

The apparatus of my invention is basically a plenum chamber which is made up of a top perforated sealing member 10 which in this case is a flat plate containing a plurality of apertures 11. The chamber also includes a bottom plate member 12 which is joined to the sealing member 10 by wall members 13 completing the enclosure. A strip heating element 14 is provided along plate 12 in order to heat plate 12 which in turn heats the incoming gas. A hot gas is introduced into the plenum chamber through tubing 16 and this gas is directed by baffle 17 in a thin layer against the heated bottom plate. The gas thus introduced can be preheated and brought to the desired temperature by heating within the plenum chamber in the manner shown. Tubing 16 can be slightly flexible so that a Bernoulli effect from the gas passing from tubing 16 and between baffle 17 and bottom plate 12 holds baffle 17 close to plate 12. The incoming gas is thus readily heated. The gas used can be any available gas which will not cause undue oxidation of the film or corrosion of the equipment. Air is by far the most practical gas but nitrogen, carbon dioxide or the like could be used.

The hot air passes through perforations 11 and is dispersed above plate 10 so that it floats the package 18 on which the film is to be sealed. The air film blanketing the surface of plate 10 sufficiently reduces the friction between the film being sealed and the plate that there is substantially no tendency of the film to tear even though heated above its crystalline freeze point.

In order to provide a satisfactory air film between plate 10 and the film being sealed the perforations 11 should have a diameter in the range of about 1/64 to 1/8 inch and should be spaced on about 1/8 to 1/2 inch centers, depending upon the size of the package. The larger the package, the larger the perforations can be. The flow of air should be sufficient to float the package on the surface of plate 10. By "float" I mean that the package should easily move across the surface of the plate when the plate is tipped slightly (about 15°). Generally, a pressure of about 5 to 10 p.s.i.g. is maintained in the plenum chamber.

The air temperature should be about 2 to 25° F. above the crystalline freezing point of the polymer. For polyethylene having a crystalline freezing point of 252° F. the temperature of the air should be in the range of about 254 to 277° F. The dwell time of the package on the sealing plate will be about 0.2 to 1.5 seconds depending upon the thickness of the film being sealed and the temperature of the air. Generally the film thickness will be in the range of 0.25 to 1.5 mils and ordinarily the thickness is from 0.5 to 1 mil. I prefer to use film having a thickness of 0.75 mil.

In addition to reducing the friction between the film and the sealing surface, it is also necessary to provide an even pressure against the multiple layers of film so that they do not tend to shrink or wrinkle when they are heated to the sealing temperature. The problem involved in sealing film around soft packaged articles such as paper boxes is illustrated in FIGURE 2. In this drawing, a box 19 is shown on its side with one corner cut-away to show the multiple layers which make up the bottom of the carton. The flaps of the carton when overlapped provide a wall having a thickness ranging from 1 to 3 times the thickness of board used in the carton. As shown in the cut-away portion, the bottom of the carton is made up of an end tab 20 and two side flaps 21 and 22. Since the carton is more rigid at the edges there is a tendency for the bottom of the carton to curve inwardly as pressure is applied to the film being sealed. Also, as illustrated in the carton shown in FIGURE 1, there are spaces at points 23 and 24 where an uneven backing surface is provided by the carton so that it is difficult to maintain an even pressure on the film while it is being heated to sealing temperature.

These problems can be overcome according to the number of embodiments of my invention which are illustrated in FIGURES 3, 4, and 7. In FIGURE 3, the flat plate 10 has been replaced with a perforated flexible membrane 26. The pressure of the air within the plenum chamber causes membrane 26 to conform to the irregular backing surface provided by carton 18. Membrane 26 is also perforated in the same manner as plate 10 so that a film of air is maintained between the sealing member and the film thereby reducing the friction between the two. An alternate embodiment is shown in FIGURE 4 in which the surface of the sealing plate is contoured to conform to the irregularities of a particular package. In this embodiment the sealing plate is stepped and cambered so that as the package is moved across the plate in the direction indicated by the arrow, the sealing plate will intermittently conform to the surface of the package and provide a more uniform pressure against the film. In the view shown in FIGURE 4 a step 27 is shown fitting within the irregularity of the bottom of the package caused by the overlapping flaps. This irregularity has been exaggerated in the view shown in order to illustrate more clearly this aspect of my invention. Alternatively the individual stepped portions 28 which make up the sealing plate can be separate members resiliently held in position so that each plate is depressed slightly as the package moves across it.

In another embodiment which effectively provides an even pressure against the overlapped portion of the film, FIGURE 7 shows a sealing plate which is made up of a plurality of individual cambered pieces linked together in such a manner that each piece is individually movable for a short distance (e.g. about 1/16 inch) in a vertical direction. The pressure of the air beneath the sealing surface tends to push each cambered piece 29 within the recesses formed by the uneven backing surface of the package.

As an improvement in the embodiment of FIGURE 1, I have provided each of the apertures in the sealing plate with an excess flow valve, examples of which are shown in FIGURES 5 and 6. As shown in FIGURE 5, a plurality of brads or screws 30 are held in position by plate 31 beneath perforated plate 32 carrying apertures 33. The apertures are normally open but the pressure of the air forces the screws 30 into the recessed lower portion of each aperture so that all but a small portion of the air flow is cut off. As the package moves across plate 32 covering aperture 33, the back pressure created within the apertures permits the screws 30 to fall back allowing more air to flow through the apertures. The increased air flow heats the film and provides the layer of air separating plate 32 and the film as previously discussed. It can be seen that each hole acts as an excess flow valve which is normally open but is closed by the air pressure below the plate and opens when the wrapped package passes over it. As a result, the hot air is released only under the package and the heated air is not wasted in the uncovered areas. Also there is less tendency to burn through the edges of the package. The greatest advantage, however, is the fact that such excess flow valves permit the greatest pressure and thereby the greatest heat in the center of the package. This applies an even sealing pressure on the multiple film layers against an uneven package surface which tends to be depressed inwardly during the sealing operation. These excess flow valves can take a number of different forms and an alternate embodiment is shown in FIGURE 6 in which reeds 34 cover all but a small portion of each hole on the under side of plate 32. Reeds 34 are sufficiently flexible that the air pressure from below closes them but the back pressure created in holes 33 as the package passes over plate 32 causes the reeds to spring back allowing more air to pass through these holes.

As an example of the method of my invention, polyethylene film having a crystalline freeze point of 252° F. and a thickness of 0.75 mil is sealed in an overwrap on a paper carton having dimensions of 3 x 4 x 1½ inches. A perforated aluminum plate carrying holes 1/16 inch in diameter and spaced on 1/4 inch centers is used as the sealing surface. Hot air at 200° F. is passed into the plenum chamber beneath the plate and heated therein to 265° F. The air in the plenum is maintained at a pressure of 5 p.s.i.g. The package carrying the film overwrap is moved across the sealing plate and contacted by the hot air for a period of 0.8 second during which time the film is heated to above its crystalline freeze point and sealed without tearing or wrinkling.

Crystalline freeze point is determined by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.

As will be evident to those skilled in the art, other modifications can be made in both the method and apparatus of my invention without departing from the spirit or scope thereof.

I claim:

1. The method of sealing thermoplastic film overwrap on a package which comprises passing said package over a perforated surface so that the overlapped film is sandwiched between the package and said surface, and passing heated gas through the perforations in said surface in an amount to float said package and to heat said film above its crystalline freeze point while continuously moving said package over said surface.

2. The method of sealing thermoplastic film overwrap on a package which comprises passing said package over a perforated surface so that the overlapped film is sandwiched between the package and said surface, passing hot air through the perforations in said surface in sufficient amount to float said package, said air having a temperature of 2 to 25° F. above the crystalline freeze point of the film, and continuously moving said package so that the package dwell time on said surface is about 0.2 to 1.5 seconds.

3. The method of claim 2 wherein said thermoplastic film is polyethylene.

4. A method of sealing polyethylene film overwrap on a package which comprises passing said package over a perforated surface so that the overlapped film is sandwiched between said package and said surface, passing a plurality of air streams through the perforations in said surface in sufficient amount to float said package above said surface, thereby reducing the friction between said overlapped film and said surface, maintaining the temperature of said air streams in the range of about 254 to 277° F., controlling the rate of the passing of said package over said surface so that the dwell time of said package over said surface would be in the range of about 0.2 to 1.5 seconds.

5. A method of sealing thermoplastic film overwrap on a package which comprises passing said package over a perforated surface so that the overlapped film is sandwiched between said package and said surface, directing a plurality of hot gas streams through the perforations in said surface to maintain a film of gas between said package and said surface, maintaining the temperature of said gas streams in the range of about 2 to 25° F. above the crystalline freeze point of said thermoplastic film.

6. A method of sealing thermoplastic film overwrap on a package which comprises passing said package over a perforated surface so that the overlapped film is sandwiched between said package and said surface, directing a plurality of hot gas streams substantially only through the perforations in said surface which are under said package to maintain a film of gas between said package and said surface, maintaining the temperature of said gas stream in the range of about 2 to 25° F. above the crystalline freeze point of said thermoplastic film while continuously moving said package over said surface.

7. A method according to claim 5 wherein said thermoplastic film is polypropylene.

8. A method according to claim 5 wherein said thermoplastic film is polyethylene.

References Cited in the file of this patent

UNITED STATES PATENTS

| | | |
|---|---|---|
| 1,517,434 | Kluever | Dec. 2, 1924 |
| 1,658,489 | Lindstrom | Feb. 7, 1928 |
| 2,423,237 | Haslacher | July 1, 1947 |
| 2,481,602 | Lindh | Sept. 13, 1949 |
| 2,486,759 | Pferffer | Nov. 1, 1949 |
| 2,687,698 | Duffy | Apr. 31, 1954 |
| 2,775,677 | Schuetze | Dec. 25, 1956 |
| 2,849,347 | Uziel | Aug. 26, 1958 |
| 2,928,220 | Kannengiesser | Mar. 15, 1960 |

FOREIGN PATENTS

| | | |
|---|---|---|
| 114,269 | Australia | Dec. 4, 1941 |